United States Patent [19]
Denyer et al.

[11] Patent Number: 5,926,214
[45] Date of Patent: Jul. 20, 1999

[54] CAMERA SYSTEM AND ASSOCIATED METHOD FOR REMOVING RESET NOISE AND FIXED OFFSET NOISE FROM THE OUTPUT OF AN ACTIVE PIXEL ARRAY

[75] Inventors: Peter Brian Denyer; Jonathan Ephriam David Hurwitz; Donald James Baxter; Graham Charles Townsend, all of Edinburgh, United Kingdom

[73] Assignee: VLSI Vision Limited, Scotland, United Kingdom

[21] Appl. No.: 08/749,055

[22] Filed: Nov. 14, 1996

[30] Foreign Application Priority Data

Sep. 12, 1996 [GB] United Kingdom .................. 9619087

[51] Int. Cl.⁶ .................................................. H04N 5/217
[52] U.S. Cl. ........................................ 348/241; 348/243
[58] Field of Search .................................... 348/241, 243, 348/244, 248, 249, 250, 311, 314, 207; H04N 9/64

[56] References Cited

U.S. PATENT DOCUMENTS

| | | |
|---|---|---|
| 4,942,474 | 7/1990 | Akimoto et al. . |
| 5,140,426 | 8/1992 | Oda .......................................... 348/249 |
| 5,376,966 | 12/1994 | Takase ..................................... 348/243 |
| 5,471,515 | 11/1995 | Fossum et al. . |
| 5,477,265 | 12/1995 | Tani ......................................... 348/241 |

*Primary Examiner*—Wendy Garber
*Assistant Examiner*—Tuan V. Ho
*Attorney, Agent, or Firm*—Bell Seltzer Intellectual Property Law Group of Alston & Bird LLP

[57] ABSTRACT

A low noise operation method for a camera system having an image sensing active pixel array, the method comprising the steps of: (a) providing an optical shutter in front of an image sensing pixel array of a camera system, said image sensing pixel array having an image sensing face defined by a series of active pixels arranged in rows and columns; (b) while said shutter is closed, resetting each said pixel and then reading a first output from each said pixel; (c) opening said optical shutter for a predetermined exposure period so as to allow light to be incident upon said image sensing face of said pixel array; (d) closing said optical shutter and then reading a second output from each said pixel, without resetting said pixels; and (e) subtracting one of said first and second outputs from the other of said first and second outputs for each said pixel, so as to obtain a first difference signal for each said pixel, which first difference signal is substantially free of reset and fixed offset noise components. The first and second pixel outputs are preferably subtracted on-the-fly. The method may also include additional steps for estimating dark current fixed pattern noise and producing a modified pixel output signal which is substantially free of reset noise, fixed offset noise and dark current fixed pattern noise.

20 Claims, 3 Drawing Sheets

CAMERA SYSTEM AND ASSOCIATED METHOD FOR REMOVING RESET NOISE AND FIXED OFFSET NOISE FROM THE OUTPUT OF AN ACTIVE PIXEL ARRAY

BACKGROUND OF THE INVENTION

This invention relates to the field of image sensors, and specifically to low noise operation of active pixel arrays.

Active pixel sensor (APS) arrays are solid state image sensing structures, typically manufactured using CMOS technology. They are distinguished by integrating some form of active electronic circuitry within each pixel to produce a buffered or amplified representation of small signal charge induced by photoelectric conversion in the pixel. Typically the pixel output takes the form of a low-impedance voltage signal.

CMOS image sensors are used increasingly for consumer imaging applications, including film replacement in still cameras. For this application a high dynamic range is desirable, and this implies low noise operation. Typically, whole camera performance is desired to have pixel-referred noise lower than 100 rms ((root-mean-square) electrons, with peak signal levels of the order of 100,000 electrons.

The "active pixel" CMOS architecture is well suited to this application because it has low read noise and in general has imaging properties similar to traditional Charge-Coupled Devices (CCDs). Moreover, CMOS fabrication technology is more widely available than CCD, and has other attractive characteristics, such as lower power consumption and greater fault tolerance.

Active pixel CMOS architectures have been disclosed over a considerable period. A known disadvantage of this technology is its suceptibility to fixed pattern noise due to random voltage offsets in some transistors used in the pixels. Where such fixed pattern noise is present, the resulting images produced by the camera are marked by a fixed speckled pattern.

U.S. Pat. No. 4,942,474 (Akimoto) and U.S. Pat. No. 5,471,515 (Fossum) teach how to achieve a high degree of cancellation of the fixed offsets which would otherwise limit performance. Both of their techniques use column-based double correlated sampling to remove fixed offsets in pixel and column buffers. This involves the use of at least two capacitors in each pixel column of the array. Moreover in the image sensors described in U.S. Pat. No. 4,942,474 reset noise is present in the image sensor output signals. Pixel reset noise occurs as a consequence of resetting operations carried out on pixels in the array and is a function of temperature and photodiode capacitance in the pixel.

U.S. Pat. No. 5,471,515 further proposes the use of a photogate structure within each pixel to also enable cancellation of pixel reset noise. However, this scheme suffers from the disadvantage that such photogate pixels are larger in size than simpler photodiode pixels. Also, the image sensing area is covered with polysilicon which attenuates the sensitivity of the pixels, especially in the blue region of the visible spectrum. Moreover, dark current fixed pattern noise is still present in the resultant image produced by the camera from the individual pixels. Dark current fixed pattern noise is the term commonly used to describe electronic signal noise in the pixel outputs which is independent of the image being sensed and which is present even when the pixel array is not being exposed to an image i.e. in the "dark" condition where substantially no light is incident upon the image sensing area.

SUMMARY OF THE INVENTION

It is an object of the present invention to substantially avoid or minimise one or more of the foregoing disadvantages.

According to the present invention, a low noise operation method for a camera system having an image sensing active pixel array comprises the steps of:

(a) providing an optical shutter in front of an image sensing active pixel array of a camera system, said image sensing pixel array having an image sensing face defined by a series of active pixels arranged in rows and columns;

(b) while said shutter is closed, resetting each said pixel and then reading a first output from each said pixel;

(c) opening said optical shutter for a predetermined exposure period so as to allow light to be incident upon said image sensing face of said pixel array;

(d) closing said optical shutter and then reading a second output from each said pixel, without resetting said pixels; and (e) subtracting one of said first and second outputs from the other of said first and second outputs for each said pixel so as to obtain a first difference signal for each said pixel, which first difference signal is substantially free of reset and fixed offset noise components.

The above method avoids the need for pixel column capacitors. Moreover, the above method can be implemented in a camera system having a photodiode active pixel array so as to substantially cancel fixed offset noise and pixel reset noise whilst retaining the positive attributes of pixel compactness and good pixel spectral response.

Preferably in step (e) said first output signal is subtracted from said second output signal, for each said pixel.

Preferably, the method is employed with a camera system having a photodiode active pixel array which is manufactured in CMOS (complementary metal-oxide semiconductor logic). As aforementioned, active pixel CMOS arrays are particularly susceptible to fixed pattern noise due to voltage offsets.

Advantageously, said first and second outputs for each pixel are subtracted on-the-fly as said second output is read. The first difference signal may be subsequently stored in a frame store of the camera system in which the method is used. By performing this subtraction on-the-fly, memory space in the frame store is saved and, moreover, processing time is minimised. The subtraction may be performed on-the-fly by, for example, reading said first output from said pixel to a respective memory location in the camera system, and subsequently reading said second output from each said pixel whilst simultaneously reading the memory-stored first output and presenting both to a subtractor circuit which performs a subtraction operation to obtain said first difference signal, and storing said first difference signal, in the memory location previously occupied by said first output. The memory location may be in an image frame store.

Preferably, said first and second outputs for each pixel are converted from analogue to digital signals, prior to their subtraction, by means of analogue to digital (A/D) signal convertor means. The A/D signal convertor means is preferably provided in the camera system in which the method is used. The A/D convertor means may be in the form of a discrete unit to which pixel outputs are input from the pixel sensor array, digital outputs from the A/D convertor means being input to an image frame store of the camera system, preferably via subtraction means for performing on-the-fly subtractions. Alternatively, the A/D convertor means may be implemented in a distributed fashion within the pixel array without affecting the operation of the method according to the invention.

In order to eliminate dark current fixed pattern noise from the resultant output signal for each pixel, the method may further include a "second phase" comprising the following further steps:

(f) storing said first difference signal, preferably in an image frame store;

(g) while said optical shutter is closed, resetting each said pixel and then reading a third output from each pixel;

(h) maintaining said optical shutter closed for a predetermined length of time at the end of which a fourth output is read from each pixel, without resetting said pixels, the difference between said third and fourth outputs comprising an estimate of dark current fixed pattern noise; and (i) operating on said third and fourth outputs and said stored first difference signal, for each said pixel so as to obtain a modified pixel output signal which modified pixel output signal is substantially free of reset noise, fixed offset noise and dark current fixed pattern noise.

Advantageously, in step (d) said second output from each pixel is read substantially at the end of said predetermined exposure period.

Said predetermined length of time in step (h) may be equal to said predetermined exposure period in step (d) in which case step (i) of the method comprises the following sub-steps:

($j_1$) subtracting said third output from said fourth output for each pixel so as to obtain a second difference signal for each pixel, and ($j_2$) subtracting said second difference signal for each said pixel from said stored first difference signal for said pixel, so as to obtain the modified pixel output signal which is substantially free of reset noise, fixed offset noise and dark current fixed pattern noise.

Steps ($j_1$) and ($j_2$) may be achieved by adding the third output to said stored first difference signal to obtain an intermediate signal, storing said intermediate signal, and subtracting the fourth output from said stored intermediate signal.

Alternatively, said predetermined length of time may be equal to a discrete multiple of said predetermined exposure period in step (d) in which case step (j) of the method comprises the following sub-steps:

($j_a$) subtracting said third output from said fourth output for each pixel so as to obtain a second difference signal for each pixel, and ($j_b$) subtracting from said stored first difference signal said second difference signal divided by said discrete multiple, so as to obtain the modified pixel output signal which is substantially free of reset noise, fixed offset noise and dark current fixed pattern noise. This latter process has the advantage of enabling a better estimate of the dark current fixed pattern noise (over said predetermined exposure period) to be obtained.

The division operation of step ($j_b$) is preferably performed by multiplying said second difference signal by a predetermined fraction, or by alternative arithmetic operations producing the desired result.

According to a further aspect of the invention, a camera system comprises an image sensing active pixel array having an image sensing face defined by a series of active pixels arranged in rows and columns, pixel read and reset means in electronic communication with each said pixel, for reading and for resetting said pixels, and a signal output at which signals read from said pixels are output.

The camera system also includes an optical shutter positioned in front of the image sensing pixel array so as to control the amount of light incident on the image sensing face. The camera system further includes system control means for controlling the opening and closing of the optical shutter and for controlling reading and resetting of the pixels. The system control means obtains first and second outputs from each pixel in which the second output represents an image signal including reset and fixed offset noise components and the first output represents the sum of the reset and fixed offset noise components. The camera system also includes an image frame store in electronic communication with the signal output of the image sensing pixel array and having memory means for storing, at least temporarily, the first outputs of the pixels. In addition, the camera system includes arithmetic circuit means electronically connected between the image frame store and the signal output of the image sensing pixel array. For each pixel, the arithmetic circuit means subtracts one of the first and second outputs from the other of the first and second outputs so as to obtain a modified image signal for each pixel. The modified image signal is substantially free of reset and fixed offset noise components.

BRIEF DESCRIPTION OF THE DRAWINGS

Preferred embodiments of the invention will now be described, by way of example only, and with reference to the accompanying drawings in which.

DESCRIPTION OF THE PREFERRED EMBODIMENTS

Figure 1:
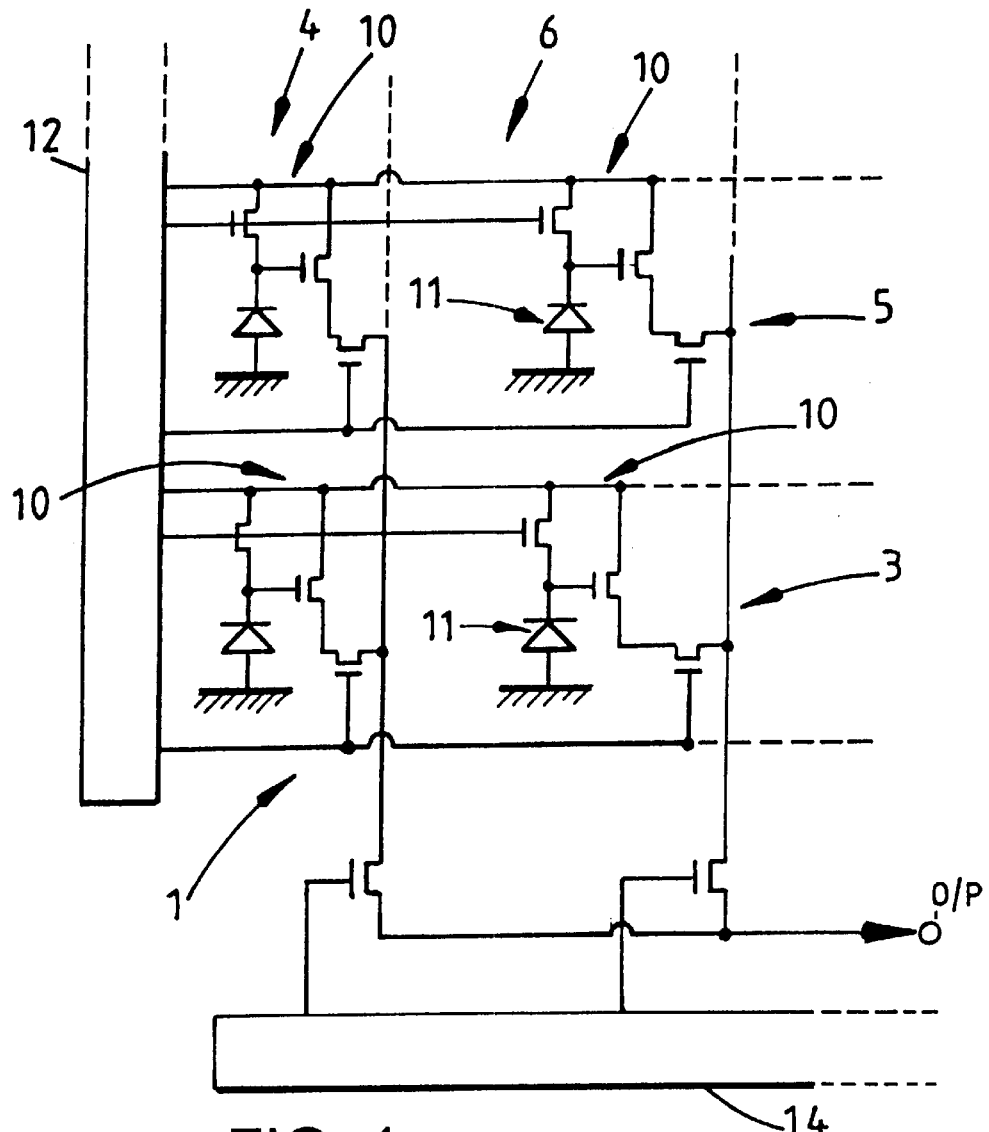
FIG. 1 is a schematic diagram of a 2×2 pixel portion of an active pixel CMOS array.

A 2×2 pixel portion of a typical active pixel array 1 in CMOS architecture is shown in FIG. 1. The array 1 comprises a plurality of rows 3, 5, . . . and columns 4, 6, . . . of active photosensitive pixels 10 defining an image sensing area. The pixels may be addressed sequentially by vertical 12 and horizontal 14 shift registers electronically connected to the pixels 10 as shown. (In an alternative embodiment, the array may be addressed by a decoded address scheme.) The shift registers are electronically connected to scanning circuitry (not shown) for scanning i.e. reading the pixel outputs to an output O/P. Many known styles of active pixel may be used for the pixels in the array. In the array of FIG. 1, the pixels 10 each comprise a photodiode 11 and associated CMOS transistor circuitry for amplifying (i.e. "buffering") the photodiode output.

Figure 2:
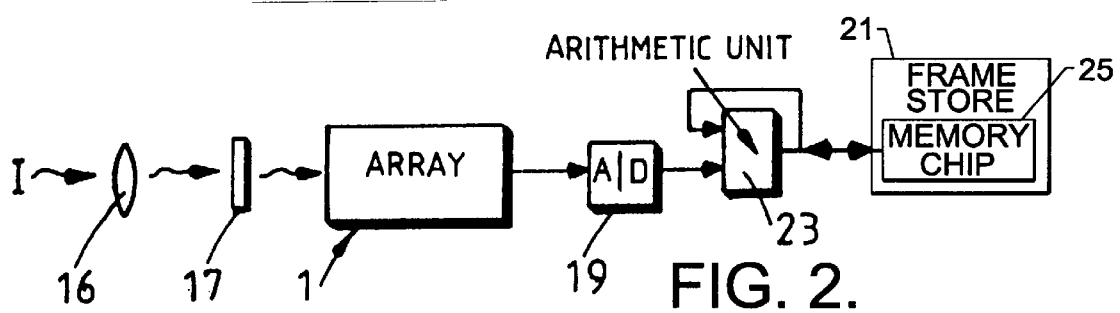
FIG. 2 is a block diagram showing the major components of a camera system in which a low noise operation method according to the invention is implemented.
Figure 3A:
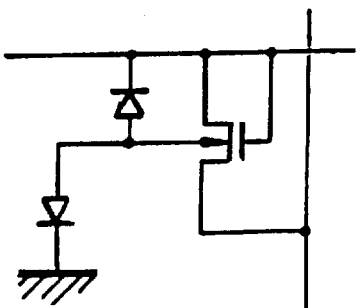
FIGS. 3 (a)–(h) each illustrate one possible style of active pixel which could be used as an alternative to the style of active pixel shown in the array of FIG. 1.
Figure 3B:
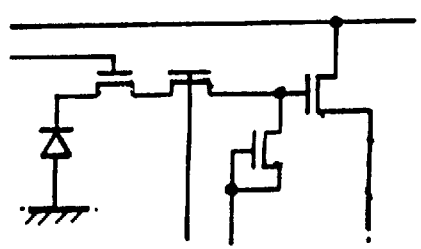
Figure 3C:
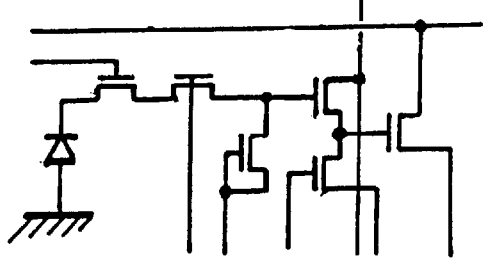
Figure 3D:
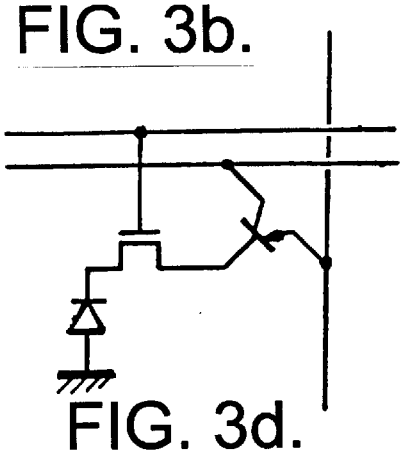
Figure 3E:
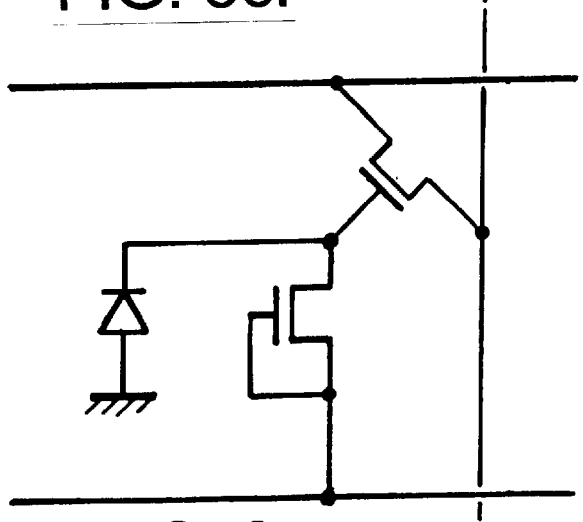
Figure 3F:
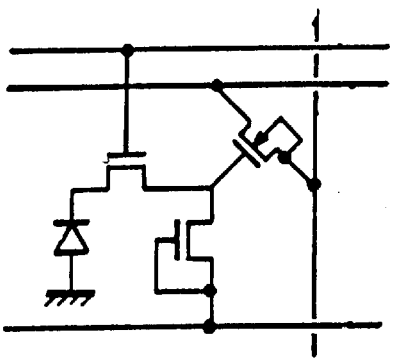
Figure 3G:
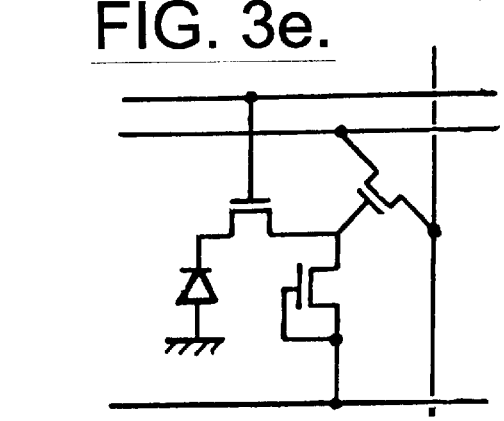
Figure 3H:
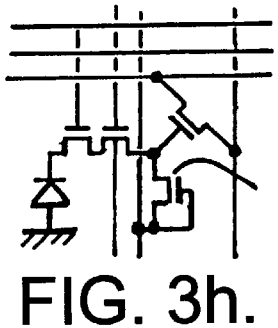

A camera system 15 incorporating the pixel array 1 of FIG. 1 is indicated in block diagram form in FIG. 2. For the purposes of the low noise operation method according to the present invention the array is situated behind an optical shutter 17 capable of blocking and passing light. The camera system 15 includes an A/D converter 19 and a frame store 21 for capturing the image as it is read. A lens 16 for focusing an incoming image I is situated in front of the optical shutter 17. This is a standard configuration for an electronic stills camera and it is an advantage of the present invention that no additional major components are required for its implementation.

Note that the A/D converter may be implemented in a distributed fashion within the array without affecting the operation of the scheme proposed here. However, in the FIG. 2 embodiment the A/D conversion is performed by an A/D converter unit 19 between the pixel array 1 and the frame store 21. An arithmetic unit 23 is included between the A/D converter 19 and the image frame store 21. The arithmetic unit 23 contains circuitry for carrying out predetermined arithmetic operations.

Image acquisition is divided into two phases. The outcome of the first phase is to obtain a first low noise image, incorporating dark current fixed pattern noise. The second phase obtains an estimate of the dark current fixed pattern noise, which is then cancelled from the first image to yield a final high quality low noise image.

Each phase is itself divided into two subphases, during each of which an image is captured from the pixel array and the difference between these two images is the output from that phase. The purpose of the two subphase images is to cancel pixel reset and circuit offset noise.

A detailed explanation of our technique is now given. During the first subphase the array of pixels is reset and then immediately read. The shutter is closed throughout this subphase. The output from any pixel at row m, column n becomes;

$$\text{Image1} = V\text{reset} + V\text{dark1},mn + V\text{ktc},mn + V\text{off},mn$$
$$+ V\text{therm1},mn + V\text{quant1},mn$$

where Vreset is the common reset potential for the array. Vdark1,mn is the dark current fixed pattern noise on the pixel between the time of reset and the time of this first reading. Vktc,mn is one sample of reset noise, whose rms value is given by $$V\text{ktc} = \sqrt{\sqrt{(kT/C)}},$$

where T is temperature and C is the photodiode capacitance, and k is Boltzmann's constant. Vquant1,mn is one sample of quantisation noise, which is a function of the quantisation step size of the A/D converter, Vstep, and whose rms value is given by $$V\text{quant} = V\text{step}/\sqrt{12},$$

and Voff,mn is the cumulative circuit offset between the photodiode m, n and the output node. Voff may include a systematic offset which will be common to all pixels, and independent offsets associated with individual pixels, and possibly with columns or groups of columns depending on the actual circuit structure. Vtherm 1,mn is one sample of thermal noise generated in the circuitry between the pixel and the A/D converter.

The Image 1 output from each pixel m,n is stored temporarily in a respective memory location in a memory chip 25 provided in the image frame store 21 for this purpose. The chip 25 is a standard DRAM or SRAM chip.

In the second subphase the shutter is opened for an exposure period, at the end of which the shutter is closed and the array is read for a second time (without resetting the pixels). The signal read from pixel m,n is now $$\text{Image2} = V\text{sig},mn + V\text{reset} + V\text{dark1},mn + V\text{dark2},mn + V\text{ktc},mn + V\text{off},\\ mn + V\text{therm2},mn + V\text{flicker1},mn + V\text{quant2},mn$$

where Vreset, Vdark1,mn, Vktc, Voff,mn are all unchanged from the first reading, and Vdark2,mn is the additional dark current fixed pattern noise contribution at pixel m,n generated between the two read operations, Vtherm2,mn is a second thermal noise sample, Vflicker1,mn accounts for any change to Voff,mn due to circuit flicker noise in the period between the two read operations, and Vquant2,mn is a second quantisation noise sample.

The two subphase images are subtracted on-the-fly as the second image is read and the result written into the frame store 21 to the location previously occupied by the Image 1 signal. For each pixel the result becomes;

$$\text{Image } A = \text{Image 2} - \text{Image 1} = V\text{sig},mn + V\text{dark2},mn + V\text{therm2},mn - \\ V\text{therm1},mn + V\text{flicker1},mn + V\text{quant2},mn - V\text{quant1},mn$$

Figure 5:
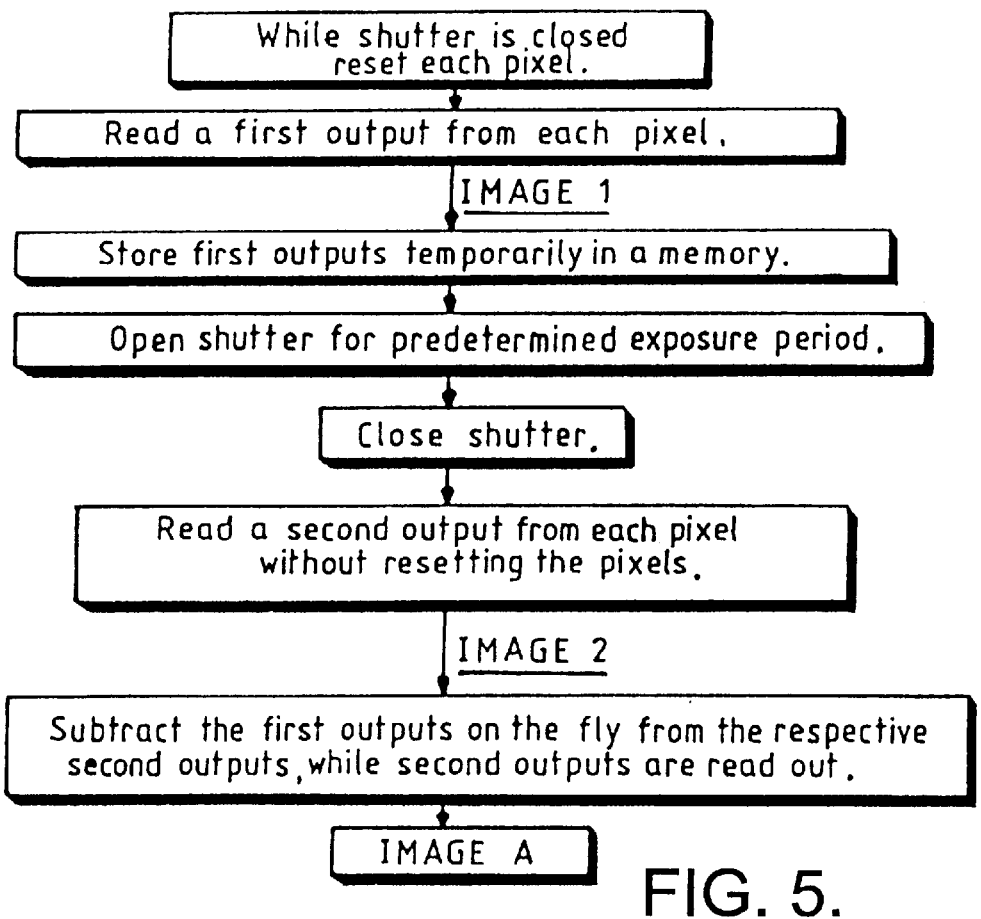
FIG. 5 is a flow chart illustrating various steps of a low noise operation method according to the invention.

Image A is the desired image (at each pixel) but contaminated by dark current contributions and thermal, flicker and quantisation noise. However, all reset and offset noise contributions have been cancelled. FIG. 5 is a flow chart which illustrates the various steps carried out as described to obtain Image A.

The on-the-fly subtraction is performed by an arithemetic circuit in the arithmetic unit 23 which subtracts successive samples of Image 1 from respective successive samples of Image 2 as Image 2 is output. In practice, this is done by presenting the Image 2 signals and the memory-stored Image 1 signal for each pixel simultaneously to a subtractor circuit in the arithmetic unit 23.

It is now possible to cancel the fixed part of the dark current contribution at each pixel, by repeating a second phase of the entire operation, but this time with the shutter always closed. Thus, in the first subphase of the second phase the array of pixels is reset and then immediately read. The shutter is closed throughout this subphase. The output from any pixel in row m, column n becomes:

$$\text{Image 3} = V\text{reset} + V\text{dark3},mn + V\text{ktc},mn + V\text{off},mn + V\text{therm3},mn + \\ V\text{quant3},mn$$

where Vreset, Vktc,mn, Voff,mn, are all the same as in Image 1. Vtherm3,mn is a third thermal noise sample, Vquant3,mn is a third quantisation noise sample.

In the second subphase of the second phase, the shutter is maintained closed for a period equal to the predetermined exposure period in the second subphase of the first phase of operation, at the end of which period the pixels of the array are read for a fourth time. The signal read from pixel m,n is now:

$$\text{Image 4} = V\text{reset} + V\text{dark3},mn + V\text{dark4},mn + V\text{ktc},mn + V\text{off},mn + \\ V\text{therm4},mn + V\text{flicker2},mn + V\text{quant4},mn$$

where the terms are all the same as before except:

Vdark4,mn is a fourth dark current sample,

Vtherm4,mn is a fourth thermal noise sample,

Vquant4,mn is a fourth quantisation noise sample, and
  Vflicker2,mn accounts for any change to Voff,mn due to circuit flicker noise in the period between the third and fourth read operations.

The fixed dark current pattern noise is substantially cancelled by subtraction of the resulting image, $$\text{Image } B = \text{Image4} - \text{Image 3},$$

from Image A. This is achieved within the existing memory resources by first adding Image3 to ImageA in the frame store, then subtracting Image4. The result will be:

$$\text{Image } A - \text{Image } B = V\text{sig},mn + V\text{shot2},mn - V\text{shot4},mn - V\text{therm1},mn + \\ V\text{therm2},mn + V\text{therm3},mn - V\text{therm4},mn + V\text{flicker1}, \\ mn - V\text{flicker2},mn - V\text{quant1},mn + V\text{quant2}, mn + V\text{quant3},mn - \\ V\text{quant4},mn$$

Where Vshot2, mn and Vshot4, mn are dark current shot noise samples. Shot noise is a known side effect of dark current. If dark current is present, and contributes an average charge of N electrons over a fixed integration period, then different samples taken over identical integration periods will vary in size with rms deviations of √N electrons. This variation is the shot noise contribution. Thus we can model Vdark2,mn and Vdark4,mn in each case as a constant component (e.g. Vconst,mn) and an additive component (Vshot2,mn etc.) which varies each time a sample is taken.

In this the constant component is common to Vdark2, mn and Vdark4, mn and is therefore cancelled in the difference Image A–Image B. The noise contributions are all random sources and sum in root-mean-square fashion to give a net rms noise of;

$$\text{Noise} = \sqrt{(2*V\text{shot}^2 + 4*V\text{therm}^2 + 2*V\text{flicker}^2)}$$

Where Vshot is the rms value of the shot noise samples Vtherm is the rms value of the circuit thermal noise Vflicker is the rms value of the circuit flicker noise.

A variant of this technique is to allow the second phase signals (Image 3, Image 4) to integrate over a longer period than the first phase signals (Image 1, Image 2), in order to obtain a better estimate of the dark current contribution at each pixel. Suppose for the second phase we use a period four times longer than the first phase. The net output image is then formed as;

$$\text{Image}C = \text{Image}2 - \text{Image}1 - 0.25*(\text{Image}4 - \text{Image}3)$$

This has the beneficial effect of reducing the noise contributions from the second phase images to give a net rms noise of:

$$\sqrt{(1.5*V\text{shot}^2 + 2.5*V\text{therm}^2 + 1.25*V\text{flicker}^2)}$$

An example of the typical magnitude of all sources is now given. The data are taken from a sensor with dark current of 800 pA/cm2, read time of 200 msec, photodiode capacitance of 15 fF and A/D resolution of 12 bits covering a signal range of 1 v at the photodiode. The raw uncorrected image from such a sensor will be virtually unusable and dominated by circuit offset noise, with equivalent fixed pattern noise of the order of 3,000 rms electrons. A single phase offset-corrected image obtained using the above described procedure has dark-current dominated noise of approximately 300 rms electrons. The same image corrected by the two phase technique as described above has net image noise of approximately 30 rms electrons.

It will be appreciated that various modifications to the above-described procedures are possible without departing from the scope of the invention. For example, in situations where dark current fixed pattern noise may be tolerable, only the first phase of the method may need to be implemented.

Also, where more memory capacity is available and/or more signal storage and retrieval can be tolerated, Image 1, Image 2, Image 3 and Image 4 signals could all be stored and the necessary arithmetic performed thereon after all four signals for each pixel have been stored. (This will not normally be desirable as increased memory and processing time is consequently needed, such features not normally being desirable in the camera system).

As afore-mentioned many different styles of active pixel are also possible. FIGS. 3(a) to (h) are a collection of various possible styles of photodiode active pixels which could be used in the pixel array 1. (Each of the FIGS. 3(a) to (h) illustrates one active pixel of an array of like pixels).

Figure 4:
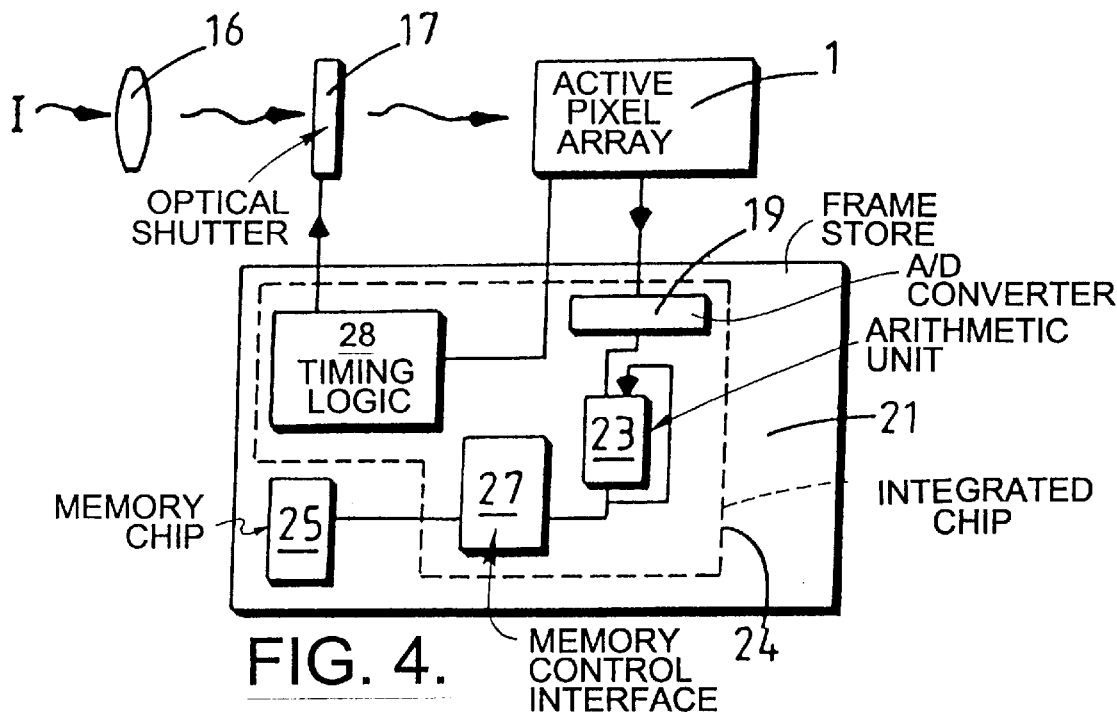
FIG. 4 is a block diagram showing additional components incorporated in the camera system of FIG. 2.

As shown schematically in FIG. 4, the arithemetic unit 23 may, in practice, be incorporated in an integrated chip 24 in the image frame store 21. The A/D converter unit 19 may be provided on the same integrated chip which could also contain a memory control interface 27 and appropriate timing logic 28 (indicated in block form only) for controlling the operation of the camera system in accordance with the above described procedures.

We claim:

1. A low noise operation method for a camera system having an image sensing active pixel array, the method comprising the steps of:
   (a) providing an optical shutter in front of an image sensing pixel array of a camera system, said image sensing pixel array having an image sensing face defined by a series of active pixels arranged in rows and columns;
   (b) while said shutter is closed, resetting each said pixel and then reading a first output from each such pixel;
   (c) opening said optical shutter for a predetermined exposure period so as to allow light to be incident upon said image sensing face of said pixel array;
   (d) closing said optical shutter and then reading a second output from each said pixel, without resetting said pixels; and
   (e) for each said pixel, subtracting one of said first and second outputs thereof from the other of said first and second outputs thereof, so as to obtain a first difference signal for each said pixel, which first difference signal is substantially free of reset and fixed offset noise components.

2. A low noise operation method according to claim 1 wherein said first and second outputs for each pixel are subtracted on-the-fly as the second output is read.

3. A low noise operation method according to claim 2 wherein said first output is temporarily stored in a respective memory location, and whilst said second output is read said first output is subtracted on-the-fly from said second output to obtain said first difference signal which is stored in said memory location.

4. A low noise operation method according to claim 3 wherein said on-the-fly subtraction is performed by simultaneously reading said memory-stored first output and said second output to a subtractor circuit which performs a subtraction operation to obtain said first difference signal.

5. A low noise operation method according to claim 1 wherein said first and second outputs for each pixel are converted form analogue to digital signals prior to their subtraction to obtain said first difference signal.

6. A low noise operation method according to claim 1 wherein said first difference signal is stored in a frame store of the camera system.

7. A low noise operation method according to claim 1, wherein the method further includes the following steps:
   (f) storing said first difference signal, preferably in a frame store;
   (g) while said optical shutter is closed, resetting each said pixel and then reading a third output from each pixel;
   (h) maintaining said optical shutter closed for a predetermined length of time at the end of which a fourth output is read from each pixel, without resetting said pixels, the difference between said third and fourth outputs comprising an estimate of dark current fixed pattern noise; and
   (i) operating on said third and fourth outputs for each said pixel and said first difference signal for the said pixel so as to obtain a modified pixel output signal for each said pixel, which modified pixel output signal is substantially free of reset noise, fixed offset noise and dark current fixed pattern noise.

8. A low noise operation method according to claim 7 wherein, in step (d), said second output from each pixel is read substantially at the end of said predetermined exposure period.

9. A low noise operation method according to claim 8 wherein said predetermined length of time in step (h) is equal to said predetermined exposure period in step (d) and step (i) comprises the following sub-steps:

($j_1$) subtracting said third output from said fourth output for each pixel so as to obtain a second difference signal for each pixel;

($j_2$) subtracting said second difference signal for each said pixel from said stored first difference signal for said pixel, so as to obtain said modified pixel output signal which is substantially free of reset noise, fixed offset noise and dark current fixed pattern noise.

10. A low noise operation method according to claim 9 wherein, steps ($j_1$) and ($j_2$) are achieved by: adding said third output to said stored first difference signal to obtain an intermediate signal; storing said intermediate signal; and subtracting said fourth output from said stored intermediate signal.

11. A low noise operation method according to claim 8 wherein said predetermined length of time in step (h) is equal to a discrete multiple of said predetermined exposure period in step (d) and step (i) comprises the following sub-steps:

($j_a$) subtracting said third output from said fourth output for each pixel so as to obtain a second difference signal for each pixel; and ($j_b$) subtracting from said stored first difference signal said second difference signal divided by said discrete multiple, so as to obtain said modified pixel output signal which is substantially free of reset noise, fixed offset noise and dark current fixed pattern noise.

12. A low noise operation method according to claim 11 wherein the division operation in step ($j_b$) is performed by multiplying said second difference signal by a predetermined decimal fraction.

13. A camera system having:

an image sensing active pixel array having an image sensing face defined by a series of active pixels arranged in rows and columns, pixel read and reset means in electronic communication with each said pixel, for reading and for resetting said pixels, and a signal output at which signals read from said pixels are output;

an optical shutter positioned in front of said image sensing pixel array so as to control the amount of light incident on said image sensing face;

system control means formed and arranged for controlling opening and closing of said optical shutter and for controlling reading and resetting of said pixels, so as to obtain first and second outputs from each said pixel, said second output representing an image signal including reset and fixed offset noise components and said first output representing the sum of said reset and fixed offset noise components;

an image frame store in electronic communication with said signal output of said image sensing pixel array and having memory means for storing, at least temporarily, said first outputs from said pixels; and arithmetic circuit means electronically connected between said image frame store and said signal output of said image sensing pixel array, for subtracting, for each said pixel, one of said first and second outputs thereof from the other of said first and second outputs thereof, so as to obtain a modified image signal for each said pixel, which modified image signal is substantially free of reset and fixed offset noise components.

14. A camera system according to claim 13 further comprising analog to digital convertor means electronically connected between said arithmetic circuit means and said signal output of said image sensing pixel array.

15. A camera system according to claim 13 further comprising one or more lenses positioned in front of said optical shutter, for focusing an image on to said image sensing pixel array.

16. A camera system according to claim 13, wherein said active pixels are fabricated in CMOS technology.

17. A camera system according to claim 13, wherein each of said active pixels includes a photodiode.

18. A camera system according to claim 13 wherein said arithmetic circuit means and said analog to digital convertor means are provided together in an integrated circuit chip.

19. A camera system according to claim 18 wherein said integrated circuit chip further includes a memory control interface for interfacing with said memory means of said image frame store.

20. A camera system according to claim 18 wherein said system control means comprises timing logic provided in said integrated circuit chip.

* * * * *